United States Patent [19]

Braren

[11] Patent Number: 4,594,915

[45] Date of Patent: Jun. 17, 1986

[54] CYCLOID TRANSMISSION ASSEMBLY

[76] Inventor: Rudolf Braren, Conollystr.26, D-8000 München 40, Fed. Rep. of Germany

[21] Appl. No.: 469,827

[22] Filed: Feb. 25, 1983

[30] Foreign Application Priority Data

Feb. 26, 1982 [DE] Fed. Rep. of Germany ....... 3206992

[51] Int. Cl.[4] .............................................. F16H 1/32
[52] U.S. Cl. ........................................ 74/805; 74/801
[58] Field of Search ................. 74/804, 805, 803, 802, 74/801, 63

[56] References Cited

U.S. PATENT DOCUMENTS

| | | | |
|---|---|---|---|
| 128,352 | 6/1872 | Andrews | 74/805 |
| 1,641,766 | 9/1927 | Laukhoff | 74/804 |
| 1,694,031 | 12/1928 | Braren | 74/804 |
| 3,534,636 | 10/1970 | Lorence | 74/805 |
| 4,177,695 | 12/1979 | Grove | 74/804 |
| 4,271,726 | 6/1981 | Ryffel | 74/805 |
| 4,297,920 | 11/1981 | Richter | 74/804 |
| 4,348,918 | 9/1982 | Fukui | 74/805 |
| 4,471,672 | 9/1984 | Butterfield | 74/804 |

FOREIGN PATENT DOCUMENTS

| | | | |
|---|---|---|---|
| 856086 | 11/1952 | Fed. Rep. of Germany | 74/805 |
| 859552 | 12/1952 | Fed. Rep. of Germany | 74/804 |
| 2433675 | 9/1980 | Fed. Rep. of Germany | 74/804 |
| 992064 | 5/1965 | United Kingdom | 74/801 |
| 1145266 | 3/1969 | United Kingdom | 74/805 |

*Primary Examiner*—Rodney H. Bonck
*Assistant Examiner*—Dwight G. Diehl
*Attorney, Agent, or Firm*—Staas & Halsey

[57] ABSTRACT

A cycloid transmission comprises a shaft having at least two eccentrics thereon, and a corresponding number of cycloid discs co-operating with respective ones of the eccentrics, with the shaft being mounted in a floating condition in the cycloid discs. The cycloid discs have raised portions at their outer radial peripheries, formed by a closed cycloid curve configuration, the raised portions engaging with rolling members carried by an outer ring member which may also form an outer casing of the assembly. Disposed on both axial sides of the cycloid discs are drive discs which support respective axial ends of drive pins that extend through bores in the cycloid discs. The outer ring member is supported on a bearing disposed at the outer periphery of the drive discs.

13 Claims, 4 Drawing Figures

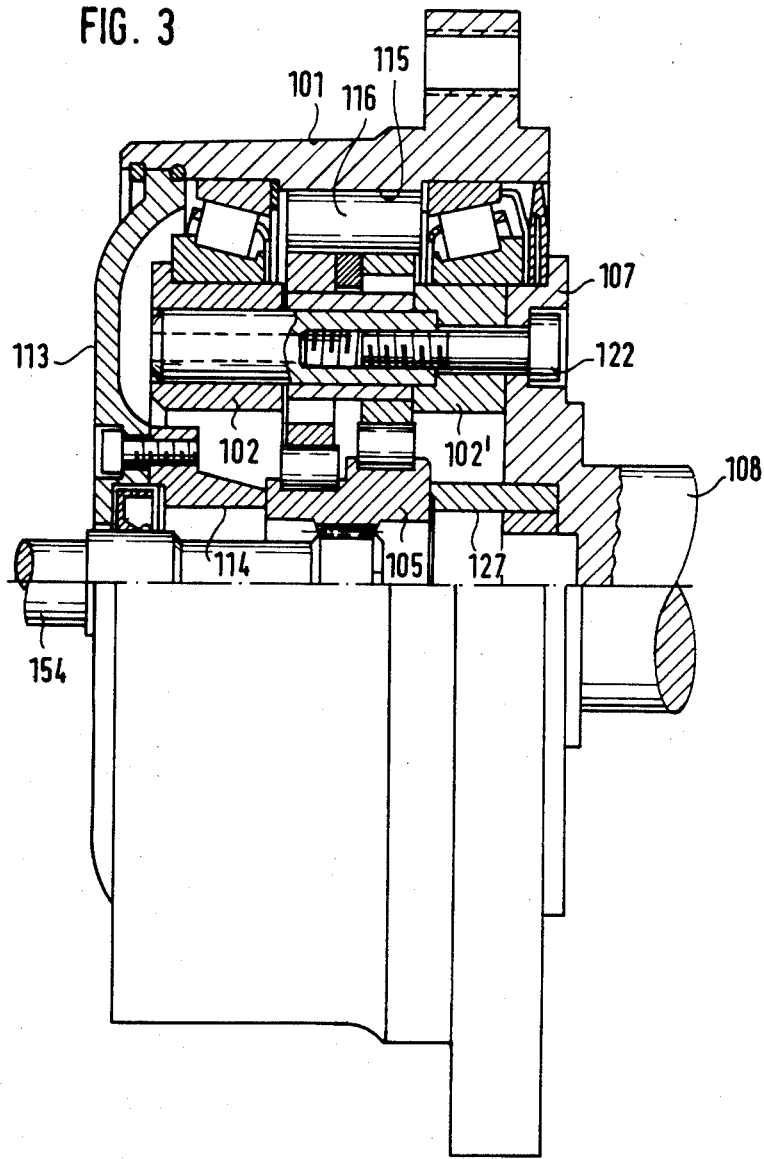

CYCLOID TRANSMISSION ASSEMBLY

BACKGROUND OF THE INVENTION

This invention is directed to a cycloid transmission.

One form of cycloid-type transmission, as disclosed for example in West German patent specification No. 856 086, comprises a shaft having two or more eccentric portions or tracks thereon. The eccentric portions are uniformly displaced relative to each other, at the periphery of the shaft. Mounted on the eccentric portions is a corresponding number of cycloid discs having a peripheral edge outline in the form of a trochoid or cycloid curve, the raised portions of which engage with pin members or rollers carried by an outer roller ring member surrounding the shaft. The raised portions on the cycloid discs thus come successively into load-bearing contact with the pin members or rollers thereon, during rotational movement thereof. Entrainment or drive discs are arranged on respective sides of the cycloid discs, while drive pin members extend through bores in the cycloid discs and are supported at both ends in the drive discs. The drive pin members are thus in power-transmitting contact with the through bores in the cycloid discs. The drive discs are connected to a shaft, or are formed to provide a shaft, while at their outer periphery they have bearing locations for rolling bearing assemblies, by way of which they are mounted in the ring member. The ring member may also form a casing surrounding the arrangement.

SUMMARY OF THE INVENTION

An object of the present invention is to provide a cycloid transmission of the general kind discussed above.

Another object of the invention is to provide a cycloid-type transmission which, while being of the same load-carrying capacity, can be smaller and lighter in construction.

A further object of the invention is to provide a cycloid transmission which has simplified mounting means for the eccentric-bearing shaft.

Yet another object of the present invention is to provide a cycloid-type transmission which gives a more uniform transmission of forces and smoothness of operation.

In accordance with the present invention, these and other objects are achieved by a cycloid-type transmission comprising a shaft having two or more eccentric means thereon, with a corresponding number of cycloid discs mounted on the respective eccentric means. The cycloid discs have raised portions formed by a closed cycloid curve configuration at their outer peripheries, with the raised portions on the respective cycloid discs operatively engaging with an outer ring member. Entrainment or power transmitting discs are disposed on both sides of the cycloid disc assembly, while power transmitting pin members extend through bores in the cycloid discs and are supported at both ends in the power transmitting discs. The transmission further has bearing locations which are provided at the outer periphery of the power transmitting discs, for supporting the outer ring member. The eccentric-bearing shaft is mounted in a floating condition in the bores defined by the cycloid discs. A floating shaft-mounting of that kind, wherein the eccentric-bearing shaft is held in a condition of balance or equilibrium only by reaction forces transmitted from the cycloid discs, only requires a support bearing arrangement at its end which projects out of the housing of the transmission, for example in a toothed or spline coupling means.

In accordance with a preferred embodiment of the present invention therefore, the eccentric-bearing shaft is in the form of a hollow shaft which is provided at its inside peripheral surface with an internal tooth or spline type coupling means. A second shaft having a corresponding external tooth or spline coupling means is thus connected to the hollow shaft, for the transmission of torque therebetween.

The above arrangement provides for a particularly advantageous mounting support for floatingly mounting the eccentric-bearing shaft, by the reaction forces which are transmitted from the cycloid discs, if the curve configurations of the cycloid discs are in accordance with the teachings of West German patent specification No. 2 433 675, to which reference is now directed. In this known cycloid-type transmission construction, there is a power-transmitting engagement between the cycloid curve configurations at the outer periphery of the cycloid discs, with pin members or rollers carried by the outer ring member of the arrangement, over a comparatively wide arcuate region, for example over an angular distance of about 100°. When the above arrangement of the invention has a power transmission configuration, over a comparatively large arcuate distance, that is to say, by way of a large number of rollers carried by the outer ring member, the resultants of the individual forces acting from the raised portions of the outer cycloid curve configurations towards the center are balanced out to provide a condition of mounting equilibrium at the eccentric-bearing shaft.

Another advantageous embodiment of the invention provides that the rollers carried by the outer ring member are in the form of pin members which are rotatably mounted in radially inwardly open grooves formed in the outer ring member and extending generally in the axial direction of the arrangement. In that case, the outer ring member advantageously forms a housing which encloses the other components of the transmission on the outside thereof. The axially extending grooves in the outer ring member may be of such a configuration and arrangement relative to each other that they engage around the peripheral surface of the respective pin members by somewhat more than 180°, with the side surfaces of the respective grooves, so that the pin members are thereby prevented from dropping out in the radial direction. However, a more advantageous construction, which is also simpler from the point of view of manufacture thereof, provides that the axially extending grooves engage around the pin members by less than 180° of the peripheral surface thereof, and that the pin members are held in position by retaining rings which bear against their peripheral surfaces. The retaining rings may be disposed between the cycloid discs and may thus have their outward peripheral surface bearing against the peripheral surfaces of the respective pin members, which when an arrangement has two cycloid discs there is one ring and when the arrangement has three cycloid discs there are two such rings. Alternatively, the retaining rings may have their outer peripheries bearing against the outer ring member, and the retaining rings may have axially extending projecting portions at their radially inward edges, which engage under the pin members from the respective ends thereof, to retain them in position. In this case, the arrangement has two such retaining rings disposed at respective ends of the array of pin members.

Further objects, features and advantages of the construction in accordance with the principles of the present invention will be more clearly apparent from the following description given by way of example of the invention.

BRIEF DESCRIPTION OF THE DRAWINGS

FIG. 3 is a view similar to that shown in FIG. 1 of a modified embodiment of a cycloid transmission in accordance with the principles of this invention.

DESCRIPTION OF THE PREFERRED EMBODIMENTS

Figure 1:
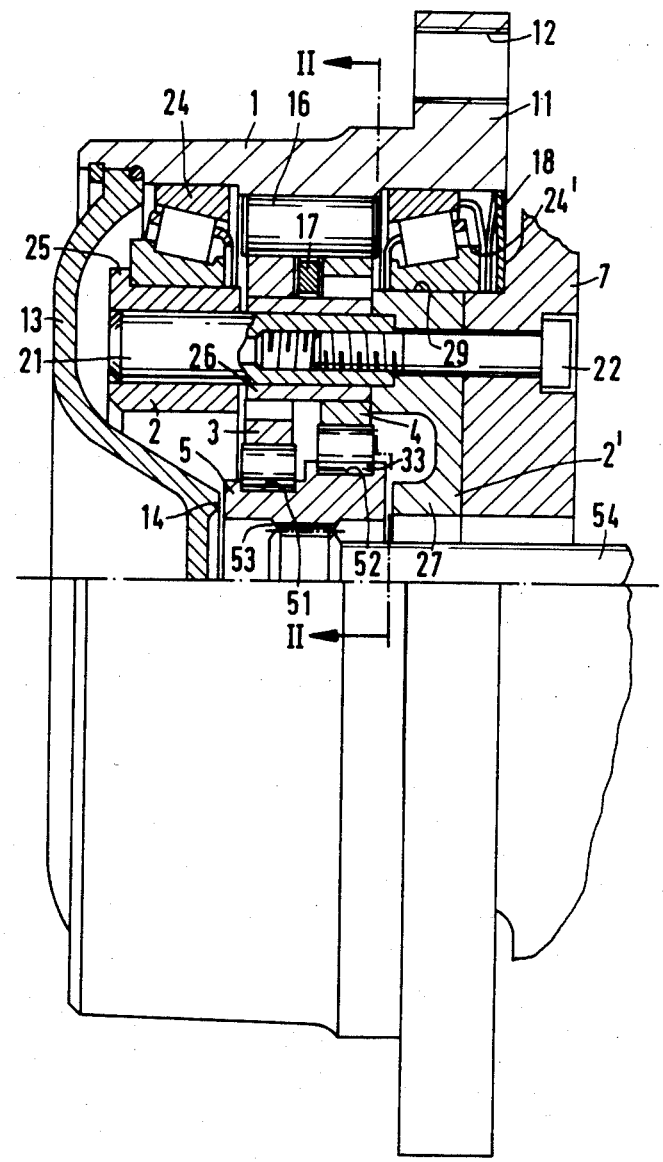
FIG. 1 is a view, partly in axial cross-section, of a first embodiment of a cycloid transmission in accordance with the present invention.

Referring firstly to FIG. 1, shown therein is a cycloid-type transmission which essentially comprises an outer ring member 1 which at the same time may form a casing for enclosing the other components of the transmission. The transmission further comprises an entrainment or drive system which comprises, in the illustrated embodiment, first and second power transmitting discs as indicated at 2, 2', and a number of entrainment power transmitting pin members 21 which are supported at respective ends thereof by the two discs 2 and 2'. There are for example eight pin members 21 in the illustrated embodiment. The transmission further comprises two cycloid discs 3, 4, each cycloid disc having a plurality of raised portions formed by closed cycloid curve configurations at their outer peripheries, and an eccentric shaft 5 which, in the illustrated embodiment of FIG. 1 is provided with first and second eccentric portions or tracks 51 and 52 in that are displaced relative to each other at 180° on the periphery of the shaft 5. The transmission may include a greater number of such eccentric means 51 and 52 than two. In the illustrated construction, the shaft 5 is a hollow shaft member and on its internal peripheral surface has a suitable coupling means shown in the form of an internal tooth or spline type coupling 53 which is in operative engagement with an external spline or tooth type coupling on a shaft portion 54. The shaft portion 54 may be connected at its other end (not shown in the drawing) to a suitable coupling, such as a tooth or spline type coupling of a motor shaft or the like.

The end edge of the outer ring member 1 which is shown on the right in FIG. 1 is constructed so as to form a flange configuration 11, which is provided with a plurality of holes 12 distributed around the periphery of the flange 11, adjacent the radially outward edge thereof, as can be clearly seen from FIG. 1. The holes 12 permit the flange 11 to be connected to a member which is to be driven, for example to the wheel hub of a directly driven vehicle wheel.

The end edge of the outer ring member 1 which is shown on the left in FIG. 1 is closed off and sealed by a cover 13, the central portion of which is formed on its inwardly facing side as an axial guide means 14 for the left-hand end surface of the shaft 5.

Reference numeral 7 in FIG. 1 denotes a member which is fixed or stationary, that is to say, a part for example of a motor vehicle frame or chassis, which forms the stationary part of the transmission. As can be clearly seen from FIG. 1, secured to the stationary member 7 are the discs 2 and 2' 2 and 2'. The power transmitting discs are secured to the member 7 by way of suitable screw means 22 which are screwed into the drive pin members 21 which extend through the cycloid discs 3 and 4 and which are supported at respective ends thereof in the discs 2 and 2'. The pin members 21 are a firm press fit in the disc 2 which is shown on the left in FIG. 1.

Provided at the outer periphery of the two discs 2 and 2' are mounting or bearing locations for respective radial taper roller bearing assemblies 24 and 24', by means of which the ring member 1 is rotatably mounted on the discs 2 and 2'.

The ring member 1 has a plurality of grooves 15 which extend in the axial direction of the arrangement, as defined by the axis of the shaft portion 54 and the shaft 5. In the illustrated embodiment, the ring member 1 has 26 axially extending grooves 15. The grooves 15 are provided for rotatably mounting and receiving rolling members illustrated in the form of pin members 16, and are adapted thereto in respect of their part-cylindrical cross-section, as can best be seen from FIG. 2. The pin members 16 are held in position by a retaining ring member 17 which is fitted between the discs 3 and 4, as shown in FIG. 1, and which is disposed tangentially with respect to the radially inwardly disposed peripheral surfaces of the pin members 16, as can be best be seen now from FIG. 2. The outer rings or races of the bearing assemblies 24 and 24' are stressed towards each other by plate springs 18, through pin members 16. For the purposes of fixing the inner ring or race of the bearing assembly 24 shown on the left in FIG. 1 in position, the corresponding drive disc 2 has a peripherally extending shoulder 25. Sleeves or bushes 26 are rotatably mounted on the pin members 21.

The cycloid discs 3 and 4 have a number of bores 31 extending therethrough, which corresponds to the number of pin members 21. The pin members 21, or more precisely the sleeves 26 mounted thereon, thus extend through the through bores 31 in the discs 3 and 4. As can be seen from FIG. 2, and as indicated above, the outer contour of the discs 3 and 4 is formed by a closed cycloid curve configuration, thus co-operating with the pin members 16 in a known manner. The cycloid discs 3 and 4 are mounted on the shaft 5, more particularly on the eccentric portions 51 and 52 thereof, by way of central bores 32 provided in the discs 3 and 4, with interposed bearing rollers 33 which thus run on the eccentric portions 51 and 52 of the shaft 5. The disc 2' shown on the right in FIG. 1 has an axially extending projecting portion 27 which serves as an axial guide and abutment means for the shaft 5 and which, in conjunction with the axial guide surface 14, defines the axial position of the shaft 5. It will be seen therefore that the shaft 5 is floatingly mounted in the discs 3 and 4, and is merely located in the axial direction by the surfaces of the portions 14 and 27.

Reference will now be made to FIG. 3 which shows a construction of a cycloid transmission substantially of the same kind as that described above with reference to FIGS. 1 and 2. In the FIG. 3 construction however, the outer ring member 101 forms the stationary member of the transmission, that is to say, a member which is stationary with respect for example to a motor vehicle frame or chassis. The drive discs as indicated at 102 and 102' are connected to a flange 107 on a drive output shaft 108 by way of suitable screw means 122. FIG. 3 also shows a driving shaft 154 which is passed sealingly through a central bore in a cover 113 which closes the transmission, with the shaft 154 being operatively engaged with the eccentric-bearing shaft 105 in the same manner as described hereinbefore with reference to FIGS. 1 and 2. It will be clearly seen from FIG. 3 that the axial position of the shaft 105 is defined by guide bushes or sleeves 114 and 127 which are disposed at respective ends of the shaft 105 and which are capable of co-operating therewith for axial location. The members 114 and 127 are respectively screwed to the cover 113 and mounted in an annular groove formed in the end surface of the shaft 108. The shaft 108 is mounted in the ring member 101 by way of the two drive discs 102 and 102'.

Figure 2:
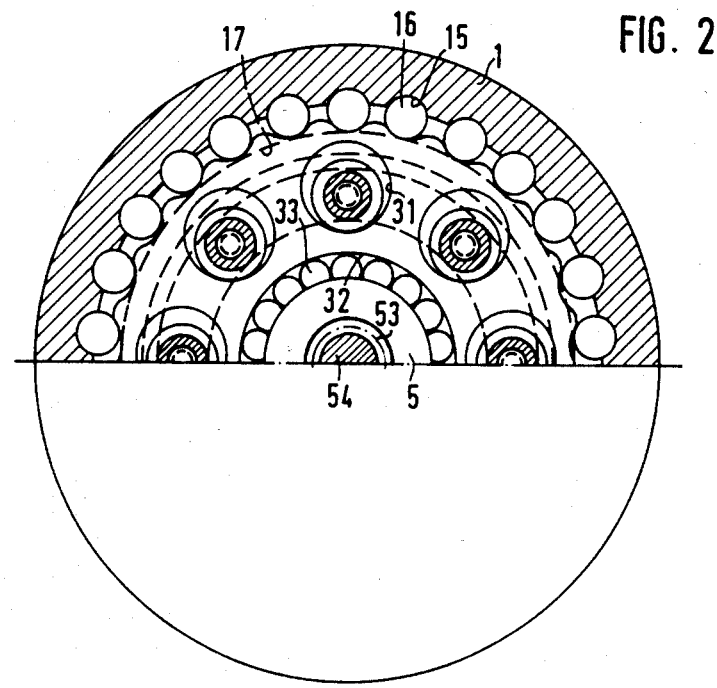
FIG. 2 is a view in cross-section taken along line II—II in FIG. 1.
Figure 4:
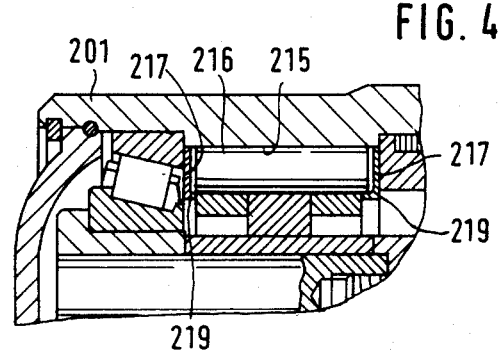
FIG. 4 is a partial view in axial cross-section of a further embodiment of a cycloid transmission according to the invention having three cycloid discs and a modified arrangement for supporting the pin members of the outer ring member.

In the construction of a further embodiment partly shown in FIG. 4, the rolling pin members 216, corresponding to the pin members 16 of the construction shown in FIGS. 1 and 2, are mounted in axially extending grooves 215 in the outer ring member 201 of the transmission. The grooves 215 are formed in the same manner as in the constructions shown in FIGS. 1 through 3. In this embodiment however, the pin members 216 are held in position by thin annular discs 217 which bear against the respective end surfaces of the pin members 216 and the outside diameter of which substantially corresponds to the inside diameter of the outer ring member 201 so that they are supported thereagainst. The inner periphery of the discs 217 has a bent-over or flanged portion 219 which projects axially towards the pin members 216 and which is so arranged as to extend under the associated adjoining end edge of the respective pin members 216, thereby to hold them in the axial grooves 215. That construction is suitable for use in cycloid transmissions in accordance with the present invention, which have three or more cycloid discs. In this case, the transmission will then only require two retaining discs or rings 217 which can be of comparatively small thickness and which therefore take up a small amount of space in the axial direction, thereby contributing to the transmission being of a compact construction.

It will be appreciated from the foregoing description of the preferred embodiments that the present invention permits the transmission to be of a very compact construction in the axial direction. The axial dimension of the transmission may be further reduced, in comparison with the illustrated embodiments, by the cycloid discs 3 and 4, and also the grooves 215 and the retaining rings 217 in the embodiment shown in FIG. 4, being replaced by cycloid discs and rings which are punched or stamped from sheet material. By using a combined punching/deep drawing process, the punched cycloid discs may be provided with a mounting sleeve which is formed integrally with the respective cycloid discs and with which they are mounted for example on the mounting rollers 33 shown in FIG. 1. The ring members which are formed by punching from sheet material, for mounting the rollers 216, may have axial bores in which the rollers 216 are mounted, instead of being mounted in the axially extending grooves 215. It will be appreciated that the outside diameter of the sheet material ring members corresponds to the inside diameter of the housing formed by the outer ring member 201 in FIG. 4, and that the retaining rings are disposed closer together, in the axial direction, in order to be able to support the rollers 216 in the bores in the rings. It has been found that a sheet material thickness of 2.5 mm is sufficient for the rings and for the cycloid discs.

It will be appreciated that the above-described embodiments have been described only by way of example of the principles of the present invention and that various alterations and modifications may be made therein without departing from the spirit and scope of the present invention.

I claim:

1. A cycloid transmission comprising:
   an outer ring member;
   shaft means disposed in the ring member;
   at least first and second eccentrics on said shaft means;
   a plurality of cycloid discs co-operable with respective ones of said eccentrics and having bores extending therethrough, said shaft means being mounted floatingly in the bores defined by said cycloid discs and held in a mounting condition of balance and equilibrium by reaction forces transmitted from the cycloid discs to the eccentrics on said shaft means, each of said cycloid discs having raised portions formed by a closed cycloid curve and operatively engaging with said ring member;
   respective power transmitting discs disposed at the sides of the cycloid discs;
   power transmitting pins extending through respective openings in the cycloid discs and having first and second end portions supported in said power transmitting discs; and
   bearing means at the outer periphery of the power transmitting discs for supporting the ring member.

2. A transmission as set forth in claim 1 wherein said shaft means is a hollow shaft portion having an inner peripheral surface and coupling means on said surface, and further comprising a shaft member having coupling means drivingly connected to said coupling means in said hollow shaft portion.

3. A transmission as set forth in claim 2 wherein said coupling means comprise spline couplings.

4. A transmission as set forth in claim 1 wherein a first one of said power transmitting discs is a stationary disc and said ring member forms a drive output means of the transmission.

5. A transmission as set forth in claim 1 wherein said ring member forms outer casing means for said transmission.

6. A transmission as set forth in claim 1 wherein said ring member has an inward peripheral surface with a plurality of radially inwardly open grooves extending axially of said ring member, and wherein rolling pin members are mounted rotatably in respective ones of said grooves, for producing the operative engagement between said raised portions on said cycloid discs and said ring member by way of said pin members.

7. A transmission as set forth in claim 6 wherein each of said grooves is of a configuration so as to engage around the respective pin member received therein over less than 180° of the periphery of said pin member.

8. A transmission as set forth in claim 7 further comprising retaining ring means bearing against the peripheral surfaces of the pin members for holding said pin members in said respective grooves.

9. A transmission as set forth in claim 8 wherein said retaining ring means is disposed between said cycloid discs and has an outer peripheral surface bearing against the peripheral surfaces of said pin members thereby to retain them in their respective grooves.

10. A transmission as set forth in claim 8 wherein said retaining ring means comprises respective retaining rings disposed at the ends of the pin members, thereby to retain said pin members in their respective grooves.

11. A transmission as set forth in claim 10 wherein each of said retaining rings has an outward peripheral surface which bears against said outer ring member and a radially inward peripheral edge portion adapted to engage said pin members to retain same in their respective grooves.

12. A transmission as set forth in claim 8 wherein said retaining ring means is formed from sheet material.

13. A transmission as set forth in claim 1 wherein each of said cycloid discs comprises sheet material.

* * * * *